United States Patent
Cheng et al.

(10) Patent No.: US 8,615,248 B2
(45) Date of Patent: Dec. 24, 2013

(54) METHOD AND DEVICE FOR REALIZING SEMI-PERSISTENT SCHEDULING SERVICE OR SEMI-PERSISTENT SCHEDULING-LIKE SERVICE

(75) Inventors: Yan Cheng, Beijing (CN); Qiang Wu, Beijing (CN); Yongxia Lv, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/570,544

(22) Filed: Aug. 9, 2012

(65) Prior Publication Data

US 2012/0309402 A1 Dec. 6, 2012

Related U.S. Application Data

(63) Continuation of application No. PCT/CN2011/070944, filed on Feb. 11, 2011.

(30) Foreign Application Priority Data

Feb. 11, 2010 (CN) .......................... 2010 1 0111542

(51) Int. Cl.
*H04W 72/00* (2009.01)
(52) U.S. Cl.
USPC .......................................................... 455/450
(58) Field of Classification Search
USPC .............. 455/13.4, 127.1, 450, 522; 370/318, 370/329, 332, 334, 341, 431, 468, 252, 280, 370/311, 336
See application file for complete search history.

(56) References Cited

U.S. PATENT DOCUMENTS

| | | | |
|---|---|---|---|
| 7,807,283 B2 | 10/2010 | Tatebayashi et al. | |
| 2010/0118807 A1* | 5/2010 | Seo et al. ..................... | 370/329 |
| 2011/0128896 A1 | 6/2011 | Huang et al. | |
| 2011/0249578 A1* | 10/2011 | Nayeb Nazar et al. ....... | 370/252 |
| 2012/0189075 A1 | 7/2012 | Wang et al. | |

FOREIGN PATENT DOCUMENTS

| | | |
|---|---|---|
| CN | 101478371 | 7/2009 |
| CN | 101499882 | 8/2009 |
| CN | 101646239 | 2/2010 |

(Continued)

OTHER PUBLICATIONS

International Search Report of Corresponding PCT Application PCT/CN2011/070944 mailed Jun. 2, 2011.

(Continued)

*Primary Examiner* — Kiet Doan
(74) *Attorney, Agent, or Firm* — Staas & Halsey LLP

(57) ABSTRACT

The present invention discloses a method and device for realizing a semi-persistent scheduling or semi-persistent scheduling-like service, which includes: notifying a terminal of its SPS or SPS-like period, so that the terminal sends SPS service or SPS-like service data according to the period and by adopting a transmission mode with a closed loop rank 1; dynamically notifying the terminal of a precoding matrix indicator PMI required for its SPS or SPS-like service to support the transmission mode with the closed loop rank 1, so that the terminal uses a latest received PMI when sending the SPS service or SPS-like service data; and receiving, by a base station and based on the transmission mode with the closed loop rank 1, the SPS service or SPS-like service data sent by the terminal. Through the present invention, the SPS or SPS-like service can support a MIMO transmission mode with the closed loop rank 1.

23 Claims, 8 Drawing Sheets

(56) References Cited

FOREIGN PATENT DOCUMENTS

| CN | 102035626 | 4/2011 |
|---|---|---|
| EP | 2234303 | 9/2010 |
| GB | 2434281 | 7/2007 |
| WO | 2009/022868 | 2/2009 |
| WO | 2009/041785 | 4/2009 |
| WO | 2009/096708 | 8/2009 |
| WO | 2009/130543 | 10/2009 |

OTHER PUBLICATIONS

International Search Report issued Jun. 2, 2011 in corresponding International Patent Application No. PCT/CN2011/070944.
Written Opinion of the International Searching Authority issued Jun. 2, 2011 in corresponding International Patent Application No. PCT/CN2011/070944.
Ericsson, ST-Ericsson, "Draft CR 36.213 Introduction of enhanced dual layer transmission", 3GPP TSG-RAN WG1 Meeting #58, Oct. 2009, 26 pages.
Chinese Office Action mailed Feb. 27, 2013 for corresponding Chinese Application No. 200980123376.9.
Ericsson, NTT DoCoMo, "E-UTRA Downlink Control Signaling-Overhead Assessment", TSG-RAN WG1 #44, Feb. 2006, R1-060573, 7 pages.
Texas Instruments, "PDCCH Content and Formats", 3GPP TSG RAN WG1 52bis, Mar. 31-Apr. 4, 2008, R1-081367, 6 pages.
Ericsson, Texas Instruments, NTT DoCoMo, Sharp, NEC, Mitsubishi, "Refinements on Signalling of CQI/Precoding Information on PDCCH", 3GPP TSG RAN WG1 52bis, Mar. 31-Apr. 4, 2008, R1-081682, 14 pages.
InterDigital Communications, LLC, "Semi-Persistent Scheduling and MIMO modes", 3GPP TSG RAN WG1 Meeting #54bis, Sep. 29-Oct. 3, 2008, R1-083512, 3 pages.
Extended European Search Report issued Dec. 7, 2012 in corresponding European Patent Application No. 11741918.4.
R1-092579: *Tx Diversity for LTE-Advanced PUSCH*, 3GPP TSG RAN WG1 Meeting #57bis, Los Angeles, CA, USA, Jun. 29-Jul. 30, 2009, Agenda Item 15.5 (10 pp.).
Office Action, dated Mar. 4, 2013, in corresponding Chinese Application No. 201010111542.8 (21 pp.).

\* cited by examiner

METHOD AND DEVICE FOR REALIZING SEMI-PERSISTENT SCHEDULING SERVICE OR SEMI-PERSISTENT SCHEDULING-LIKE SERVICE

CROSS-REFERENCE TO RELATED APPLICATIONS

This application is a continuation of International Application No. PCT/CN2011/070944, filed on Feb. 11, 2011, which claims priority to Chinese Patent Application No. 201010111542.8, filed on Feb. 11, 2010, both of which are hereby incorporated by reference in their entireties.

FIELD OF THE INVENTION

The present invention relates to communication technologies, and in particular, to a method and device for a realizing a semi-persistent scheduling service or semi-persistent scheduling-like service.

BACKGROUND OF THE INVENTION

Long term evolution (LTE, Long Term Evolution) is a standard being studied and refined currently by the 3rd generation partnership project (3GPP, 3rd Generation Partnership Project). In an LTE wireless communication system, to support technologies such as dynamic scheduling and downlink multiple input multiple output (MIMO, Multiple Input Multiple Output) transmission, a terminal needs to report channel state information (CSI, Channel State Information) to a base station through a physical uplink control channel (PUCCH, Physical Uplink Control Channel) and a physical uplink shared channel (PUSCH, Physical Uplink Shared Channel), where the CSI includes channel quality information (CQI, Channel Quality Information), precoding matrix indicator (PMI, Precoding Matrix Information) and rank indication (RI, Rank Indication).

In dynamic scheduling, the terminal is notified of scheduling information related to each scheduling time point through physical downlink control channel (PDCCH, Physical Downlink Control Channel) signaling, which provides great flexibility but also causes a heavy signaling load. For a regular low-rate service, such signaling overheads are especially significant. To reduce the signaling load of such service, the 3GPP defines a manner of semi-persistent scheduling (SPS, Semi-Persistent Scheduling), and the idea is that for the regular low-rate service, resources are allocated on a long-time basis and it is unnecessary to send PDCCH signaling to perform dynamic scheduling at each time of transmission. Usually, an SPS service is activated and deactivated by PDCCH signaling, where activating PDCCH signaling carries scheduling information such as resource allocation. Before the service is deactivated, the terminal sends new data packets at fixed periods according to the related scheduling information which is allocated when the service is activated, unless there is new PDCCH signaling to update the related scheduling information during the periods.

In an LTE R8 system, main MIMO transmission modes include single antenna port transmission, transmit diversity, and spatial multiplexing. In closed loop spatial multiplexing mode, a terminal needs to be notified of corresponding precoding information, that is, a precoding matrix indicator (PMI, Precoding Matrix Indicator), where the PMI is normally carried by PDCCH allocation information (grant). The MIMO transmission mode of the terminal is usually configured by a base station semi-statically. In the LTE R8 system, even if the transmission mode configured by the base station for a PDSCH is spatial multiplexing, a downlink SPS service of a terminal only supports transmit diversity for the following three reasons: One is that, a PDCCH grant is provided when the SPS service is activated, but subsequent data transmission has no corresponding PDCCH grant, and therefore, the PMI required for spatial multiplexing is unavailable; the second is that a data packet corresponding to the SPS service is small and does not need to be transmitted in two streams; the third is that transmit diversity also provides good transmission performance. In the LTE R8 system, the PUSCH only supports the single antenna port transmission mode, and therefore, the uplink SPS only supports the single antenna port transmission mode.

According to the latest progress of the 3GPP standard, in LTE R10, the closed loop spatial multiplexing technology will be used in the uplink while the transmit diversity technology will not be adopted. Then, if the MIMO transmission mode configured by the base station for the PUSCH is spatial multiplexing, while in an existing SPS mechanism, no PDCCH grant is provided except for the initial transmission so that the PMI is unavailable, and the single antenna port transmission mode has to be returned to.

SUMMARY OF THE INVENTION

Embodiments of the present invention provide a method and device for realizing a semi-persistent scheduling service or semi-persistent scheduling-like service, so that such service supports a MIMO transmission mode with closed loop spatial multiplexing.

For the foregoing purpose, the embodiments of the present invention provide the following technical solutions:

A method for realizing a semi-persistent scheduling service or semi-persistent scheduling-like service includes:

notifying a terminal of its SPS or SPS-like period, so that the terminal sends data of the SPS service or SPS-like service according to the period and by adopting a transmission mode with a closed loop rank 1;

dynamically notifying the terminal of a precoding matrix indicator PMI required for its SPS service or SPS-like service to support the transmission mode with the closed loop rank 1, so that the terminal uses a latest received PMI when sending SPS service or SPS-like service data; and receiving, based on the transmission mode with the closed loop rank 1, the SPS service or SPS-like service data sent by the terminal.

A method for realizing a semi-persistent scheduling service or semi-persistent scheduling-like service includes:

by adopting a transmission mode with a closed loop rank 1, sending, by a terminal, the SPS service in an SPS period configured by a base station or sending SPS-like service data in an SPS-like period; and obtaining a new PMI that is notified by the base station dynamically and required for the SPS service or SPS-like service to support the transmission mode with the closed loop rank 1 and in the SPS period configured by the base station or in the SPS-like period, using the new PMI to send the SPS service or SPS-like service data.

A base station includes:

a period notifying unit, configured to notify a terminal of its SPS or SPS-like period, so that the terminal adopts a transmission mode with a closed loop rank 1 to send SPS service or SPS-like service data according to the period;

a PMI notifying unit, configured to dynamically notify the terminal of a PMI required for its SPS service or SPS-like service to support the transmission mode with the closed loop rank 1, so that the terminal uses a latest received PMI when sending the SPS service or SPS-like service data; and a receiving unit, configured to receive, based on the transmission mode with the closed loop rank 1, the SPS service or SPS-like service data sent by the terminal, where the terminal sends the SPS service or SPS-like service data according to the period received from the period notifying unit and by using the latest PMI received by the PMI notifying unit.

A terminal includes:

a PMI obtaining unit, configured to obtain a PMI that is notified by a base station dynamically and required for an SPS service or SPS-like service to support a transmission mode with a closed loop rank 1; and a sending unit, configured to, by adopting the transmission mode with the closed loop rank 1, send the SPS service in an SPS period configured by the base station or send SPS-like service data in an SPS-like period, and, after the PMI obtaining unit obtains a new PMI, use the new PMI to send the SPS service or SPS-like service data in the SPS period configured by the base station or in the SPS-like period.

According to the method and device for realizing the semi-persistent scheduling service or semi-persistent scheduling-like service in the embodiments of the present invention, the base station dynamically notifies the terminal of the PMI required for its SPS service or SPS-like service to support the transmission mode with the closed loop rank 1, which may make such kind of service support the MIMO transmission mode with closed loop spatial multiplexing, and can effectively improve the transmission performance of such kind of service.

DETAILED DESCRIPTION OF THE EMBODIMENTS

To help those skilled in the art better understand technical solutions of embodiments of the present invention, the embodiments of the present invention are illustrated in detail with reference to accompanying drawings and implementation manners.

To improve the transmission performance of an SPS service or SPS-like service, the SPS service or SPS-like service may be made to support a closed loop spatial multiplexing MIMO transmission mode. For this purpose, the embodiments of the present invention provide a method and device for realizing the SPS service or SPS-like service, where a terminal is notified dynamically of a PMI required for its SPS service or SPS-like service, which guarantees that the SPS service or SPS-like service supports the closed loop spatial multiplexing MIMO transmission mode.

A process of realizing the SPS service or SPS-like service is described in detail with regard to the base station side and the terminal side separately.

It should be noted that, in the embodiments of the present invention, the SPS-like service is a non-SPS service that is activated and released through PDCCH signaling or that transmits information on a predefined frequency resource at fixed periods through higher layer signaling configuration, for example, an service such as periodic CSI feedback on PUSCH or sending of an uplink SRS (Sounding Reference Signal, sounding reference signal) with precoding. The sending of an uplink SRS with precoding means that based on the LTE R8 SRS transmission mechanism, each sent SRS is precoded by using the PMI. The SPS or SPS-like period means a time interval for transmission of a new packet in the SPS or SPS-like service on a predefined frequency resource.

Figure 1:
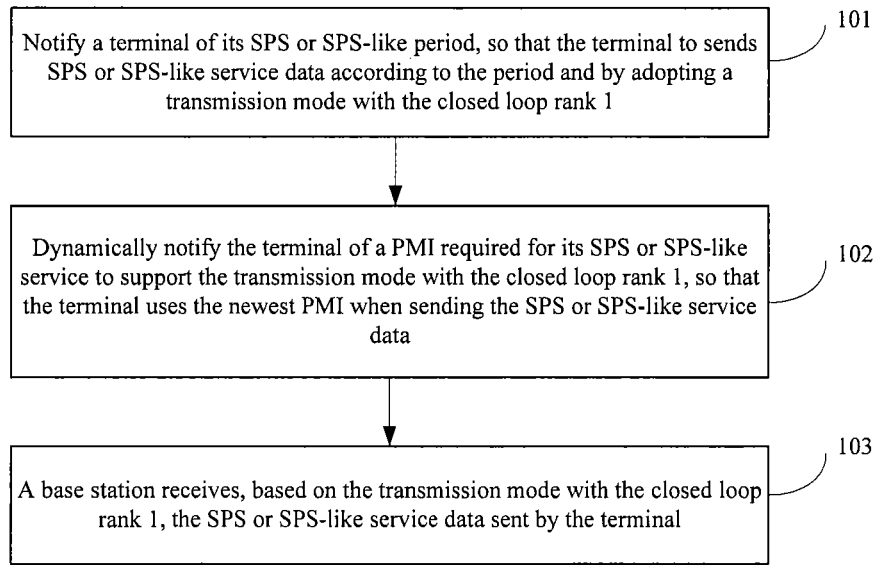
FIG. 1 is a flowchart of a method for realizing an SPS service or SPS-like service on a base station side according to an embodiment of the present invention.

As shown in FIG. 1 is a flowchart of a method for realizing an SPS service or SPS-like service on a base station side according to an embodiment of the present invention, including the following steps:

Step 101: Notify a terminal of its SPS or SPS-like period, so that the terminal adopts a transmission mode with the closed loop rank 1 to send SPS service or SPS-like service data according to the period.

Specifically, a base station may perform configuration through a higher layer and send PDCCH uplink allocation information (UL grant) to the terminal to activate the SPS or SPS like service, or merely configure, through the higher layer, that the terminal transmits the SPS-like service.

According to the period and by adopting the transmission mode with the closed loop rank 1, the terminal may send the SPS service or SPS-like service data at a frequency resource defined in the PDCCH uplink allocation information or a frequency resource configured at the higher layer.

Usually, PDCCH signaling that indicates PUSCH allocation information is referred to as a UL grant and PDCCH signaling that indicates physical downlink shared channel (PDSCH, Physical Downlink Share Channel) grant information is referred to as a DL grant. In LTE R8, when the UL grant or DL grant is masked by using the SPS-RNTI, the UL grant or DL grant also serves a function of activating the SPS service.

In specific application, the base station may notify the terminal of its SPS or SPS-like period through higher layer signaling such as radio resource control (RRC, Radio Resource Control) signaling, or may notify the terminal of its SPS or SPS-like period through the PDCCH signaling.

Step 102: Dynamically notify the terminal of a PMI required for its SPS service or SPS-like service to support the transmission mode with the closed loop rank 1, so that the terminal uses the latest PMI when sending the SPS service or SPS-like service data.

Step 103: The base station receives, based on the transmission mode with the closed loop rank 1, the SPS service or SPS-like service data sent by the terminal.

After the sending of the SPS service or SPS-like service is completed, the base station may send PDCCH uplink allocation information to the terminal to deactivate the SPS service or SPS-like service, or the SPS service or SPS-like service ends automatically according to the configuration at the higher layer.

In the method for realizing an SPS service or SPS-like service according to the embodiment of the present invention, the base station dynamically notifies the terminal of the PMI required for the SPS service or SPS-like service to support the transmission mode with the closed loop rank 1, which thereby, may makes the SPS service or SPS-like service support the closed loop spatial multiplexing MIMO transmission mode, and effectively improve the transmission performance of the SPS service or SPS-like service.

Figure 2:
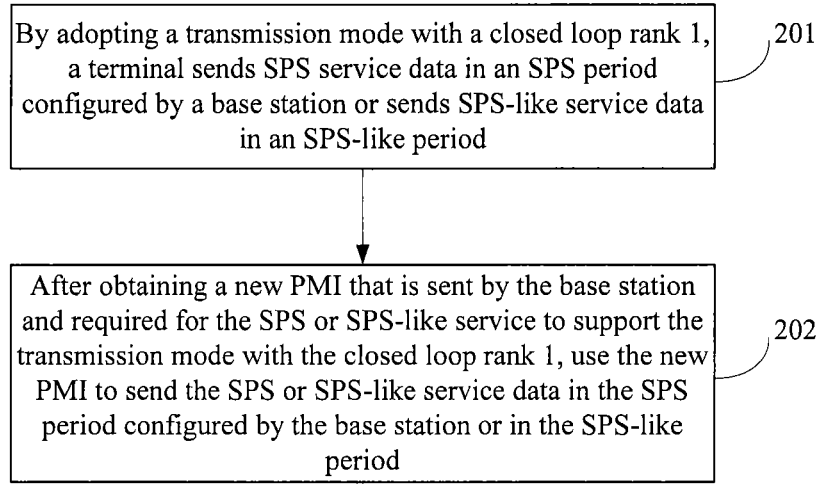
FIG. 2 is a flowchart of a method for realizing an SPS service or SPS-like service on a terminal side according to an embodiment of the present invention.

As shown in FIG. 2 is a flowchart of a method for realizing an SPS service or SPS-like service on a terminal side according to an embodiment of the present invention, including the following steps:

Step 201: By adopting a transmission mode with the closed loop rank 1, a terminal sends SPS service in its SPS period configured by the base station or sends SPS-like service data in an SPS-like period.

Step 202: After obtaining a new PMI that is sent by the base station and required for the SPS service or SPS-like service to support the transmission mode with the closed loop rank 1, use the new PMI to send the SPS service or SPS-like service data in the SPS period configured by the base station or in the SPS-like period.

According to different manners for the base station to send the PMI, there may be multiple manners for the terminal to obtain the PMI, which will be illustrated in detail hereinafter.

In the method for realizing an SPS service or SPS-like service according to the embodiment of the present invention, the terminal sends the SPS service or SPS-like service data by adopting the transmission mode with the closed loop rank 1 and, after obtaining the new PMI that is sent by the base station and required for the SPS service or SPS-like service to support the transmission mode with the closed loop rank 1, use the new PMI to send the SPS service or SPS-like service data, which thereby may make the SPS service or SPS-like service supports the closed loop spatial multiplexing MIMO transmission mode, and effectively improve the transmission performance of the SPS service or SPS-like service.

To realize that the base station dynamically notifies the terminal of the PMI required for its SPS service or SPS-like service to support the transmission mode with the closed loop rank 1, on the basis of LTE R8, a PDCCH grant may be delivered to each terminal at a moment when the PMI needs to be updated. That is, before the service is deactivated, if the PMI is not required to be updated, the terminal will send a new packet in a fixed period according to related scheduling information allocated during activation, and if the PMI is required to be updated, the PDCCH grant is sent to update the scheduling formation related to the SPS service or SPS-like service and the terminal will send data according to the updated PMI at a next sending moment.

However, the adoption of this manner causes high PDCCH overheads, because it is necessary to send one PDCCH grant to each terminal that needs to update the PMI, so as to notify the terminal of the PMI most proper for the next time of data transmission. For example, if the total number of SPS service users that needs to update the PMI at a certain transmission time interval (TTI, Transmission Time Interval) is N, N PDCCH grants need to be sent at the TTI. Assuming the resource occupied by each PDCCH grant is one control channel element (CCE, Control Channel Element) (the minimum resources occupied by PDCCH signaling), N CCEs need to be consumed to update the PMIs of N terminals having SPS service or SPS-like service.

To further reduce the resource overheads, other manners may be adopted to dynamically notify the terminal of the PMI required for its SPS service or SPS-like service to support the transmission mode with the closed loop rank 1, and are illustrated separately in detail in the following.

First Manner

In a wireless communication system, a base station usually sends control information, such as uplink resource allocation, downlink resource allocation, and other information useful for a terminal, to the terminal through a control channel. For example, control information sent through a PDCCH in an LTE system includes resource block (RB, Resource Block) allocation, transmit power control (TPC, Transmit Power Control) command, hybrid automatic repeat request (HARQ, Hybrid Automatic Repeat Request) process number, precoding information, modulation and coding scheme, new data indication, redundancy version and so on.

At present, there are ten different types of downlink control information (DCI, Downlink Control Information) formats in the LTE standard, where, DCI format 0 is used to indicate PUSCH allocation information;

DCI format 1 is used to indicate PDSCH allocation information in a single-input multiple-output (SIMO, Single-Input Multiple-Output) mode;

DCI format 1A is used to indicate information such as PDSCH allocation information of tight resource allocation in the SIMO mode, random access response, and so on;

DCI format 1B is used to indicate PDSCH allocation information of tight resource allocation in a spatial multiplexing mode with a closed loop rank 1;

DCI format 1C is used to indicate information such as paging, random access response and so on;

DCI format 1D is used to indicate PDSCH allocation information of tight resource allocation in a MU-MIMO mode;

DCI format 2 is used to indicate PDSCH allocation information in a closed loop spatial multiplexing mode;

DCI format 2A is used to indicate PDSCH allocation information in an open loop spatial multiplexing mode;

DCI format 3 is used to indicate a 2-bit power control command of a uplink channel of multiple users; and DCI format 3A is used to indicate a 1-bit power control command of the uplink channel of multiple users.

In the embodiment of the present invention, DCI format 3B or 3C may be newly added, and DCI format 3B or 3C is used to multicast a PMI. This means the PMI required by one group of terminals is notified together. DCI format 3B corresponds to a 2-bit PMI, for example, in a case where the number of transmit antennas of a terminal is 2; and DCI format 3C corresponds to a 4-bit PMI, for example, in a case where the number of transmit antennas of a terminal is 4.

The loads of DCI formats 3B and 3C may be the same as the load of DCI format 0, for example, 28 bits when a system bandwidth is 20 MHz. The content of DCI formats 3B and 3C may be set as follows:

PMI command 1, PMI command 2, PMI command 3, ..., PMI command N.

In the case of DCI format 3B, $$N = \left\lfloor \frac{L_{DCI\ format\ 0}}{2} \right\rfloor;$$

in the case of DCI format 3C, $$N = \left\lfloor \frac{L_{DCI\ format\ 0}}{4} \right\rfloor,$$

where $L_{DCI\ format\ 0}$ is the load of PDCCH format 0 without cyclical redundancy check (CRC, Cyclical Redundancy Check), including a padding bit.

If $$\left\lfloor \frac{L_{DCI\ format\ 0}}{2} \right\rfloor < \frac{L_{DCI\ format\ 0}}{2}$$

or $$\left\lfloor \frac{L_{DCI\ format\ 0}}{4} \right\rfloor < \frac{L_{DCI\ format\ 0}}{4},$$

1 to 3 padding bits needs to be added so that the final load of DCI format 3B or 3C is the same as the load of DCI format 0.

In this manner, a terminal that has the SPS service or SPS-like service and is in the system needs to be grouped, where one group identifier is allocated to each group and one intra-group identifier is allocated to each terminal, and the terminal needs to be notified of the group identifier and intra-group identifier of the terminal.

Assuming M users form one group, a group identifier (GroupID) is used to control a resource corresponding to the group, and the group identifier may be named PMI-RNTI. Each user has a uniquely defined position in the group, which is decided by an intra-group identifier PMI-Index of each user.

Figure 3:
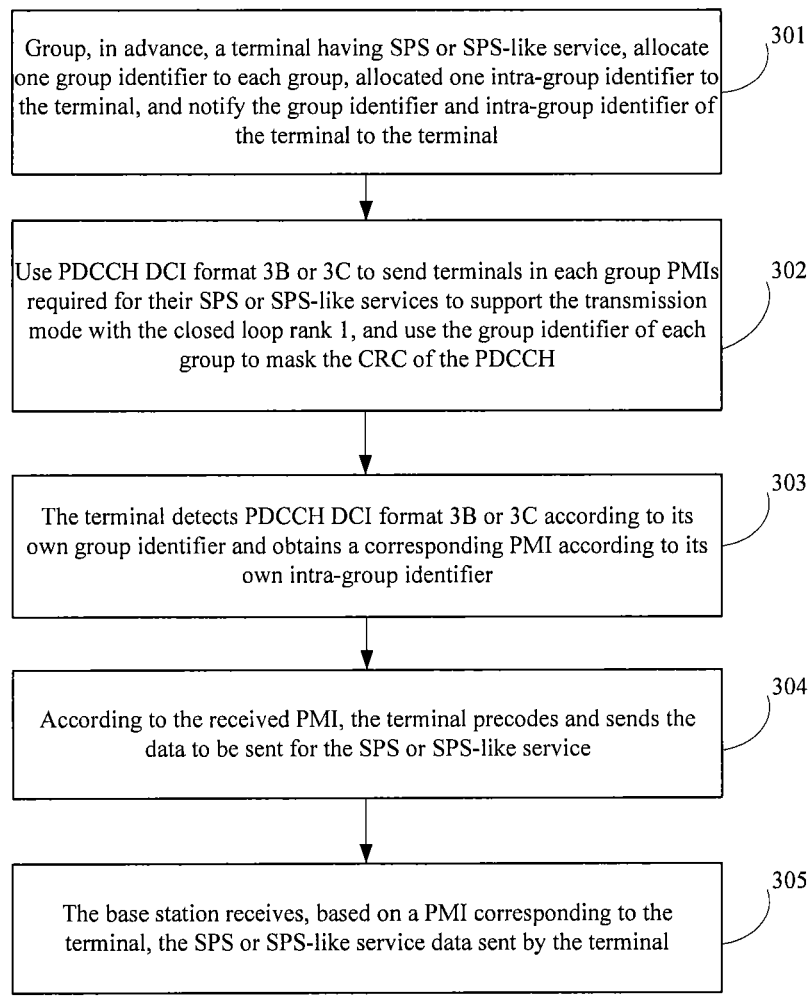
FIG. 3 is a flowchart of a method for realizing an SPS service or SPS-like service by adopting a first manner according to an embodiment of the present invention.

As shown in FIG. 3 is a flowchart of a method for realizing an SPS service or SPS-like service by adopting the first manner according to an embodiment of the present invention, including the following steps:

Step 301: Group, in advance, a terminal having the SPS service or SPS-like service, allocate one group identifier to each group, allocate one intra-group identifier to the terminal, and notify the terminal of the group identifier and intra-group identifier of the terminal.

There may be specifically multiple allocation manners, which may be, for example, any one of manners or a combination of multiple manners in the following:

terminals with corresponding PMIs of the same number of bits are taken as one group;

terminals with corresponding PMIs having the same or proximately the same update periods (for example, the deviation of the update periods of the PMIs is within 10 ms) are taken as one group;

terminals with the same or proximately the same moments corresponding to the resources allocated for the SPS service or SPS-like service (for example, the deviation of moments corresponding to the allocated resources is within 5 ms) are taken as one group; and all or part of terminals in a TPC group corresponding to DCI format 3 or DCI format 3A are taken as one group.

Step 302: Use PDCCH DCI format 3B or 3C to send terminals in each group the PMIs required for their SPS services or SPS-like services to support the transmission mode with the closed loop rank 1, and use the group identifier of each group to mask CRC of a PDCCH.

In an LTE system, when a base station sends downlink control information to a terminal through a PDCCH, a 16-bit CRC is attached after a control information bit and a unique radio network temporary identifier (RNTI, Radio Network Temporary Identifier) is used to mask the CRC. Usually, for a PDCCH of one terminal, a special identifier of the terminal such as a cell RNTI (C-RNTI, Cell-RNTI) is used to mask the CRC; and for a the PDCCH (such as system information) of multiple terminals, a public identifier such as a system information RNTI (SI-RNTI, System Information-RNTI) is used to mask the CRC. After attaching the CRC to the control information to be transmitted and masking the CRC, the base station further needs to perform a series of processing such as channel coding, rate matching, and modulation. The rate matching needs to be performed according to the number of aggregation dimensions of CCEs of the PDCCH signaling. At present, in an LTE system, the number of aggregation dimensions of the CCEs of PDCCH signaling may be 1, 2, 4, and 8. For example, if the number of aggregation dimensions of one PDCCH signaling message is 2, it means that the time-frequency resources allocated for the PDCCH signaling are 2 CCEs. After performing a series of sending-end processing on the control information to be sent, the base station sends the control information to the terminal. Usually, multiple pieces of PDCCH signaling may be sent in one subframe. The terminal detects corresponding PDCCH signaling in a manner of blind detection. In the blind detection, a corresponding RNTI is used for de-masking, and if CRC check is successful after de-masking, it means that the corresponding PDCCH signaling is detected.

In the embodiment of the present invention, the base station uses the group identifier of each group to mask the CRC of the PDCCH.

Step 303: The terminal detects PDCCH DCI format 3B or 3C according to its own group identifier and obtains a corresponding PMI according to its own intra-group identifier.

In the embodiment of the present invention, the terminal may detect the corresponding PDCCH signaling in the manner of blind detection. In blind detection, the terminal first uses the pre-received group identifier of its own to perform de-masking, and if CRC check is successful after de-masking, it means that the corresponding PDCCH signaling is detected. Then, the terminal can obtain the corresponding PMI according to its own intra-group identifier.

Step 304: According to the received PMI, the terminal precodes and sends the data to be sent for the SPS service or SPS-like service.

Step 305: The base station receives, based on a PMI corresponding to the terminal, the SPS service or SPS-like service data sent by the terminal.

The method for realizing an SPS service or SPS-like service in the embodiment of the present invention has an advantage of low overheads. For example, assume that N terminals having the SPS service or SPS-like service need to update the PMIs in one TTI and that a system bandwidth is 20 MHz. One PDCCH DCI 3B may carry PMIs of 14 terminals. Then, N/14 DCI 3B are needed to notify all terminals of their PMIs. Assuming one PDCCH DCI 3B occupies 4 CCEs, resources required to update the PMIs of N users are (N/14)*4 CCEs. It can be seen that the overheads are greatly reduced.

It should be noted that, if a manner of statistical multiplexing is adopted, resources may be further saved. Statistical multiplexing is in fact one kind of time division multiplexing, the full name of which is statistical time division multiplexing or asynchronous time division multiplexing. Asynchronous time division multiplexing or statistical time division multiplexing is to allocate a timeslot of a common channel on demand, that is, to allocate timeslots to only terminals that need to transmit information or are at work. In this way, all timeslots are fully used and the quantity of served terminals may be greater than the quantity of timeslots, which increases the utilization rate of resources and thereby achieves the effect of multiplexing. For example, in the embodiment of the present invention, the one group identifier and one intra-group identifier that are allocated to one terminal in step 301 may be changed to multiple group identifiers and corresponding multiple intra-group identifiers, and when the SPS service or SPS-like service is activated, only one of the multiple group identifiers and one of the corresponding multiple intra-group identifiers is specified to be used by the terminal.

Second Manner

In this manner, a PDSCH is used to carry PMI information, to realize multiplexing of downlink data and the PMI. Specifically, PMI information may be carried in the PDSCH in a n–k$^{th}$ subframe. If a PDSCH is not sent in the n–k$^{th}$ subframe, because a PDSCH does not need to be sent in each subframe, a previously updated PMI is used, where n represents the current subframe, and k is a predefined value, for example, k=4 and so on.

Figure 4:
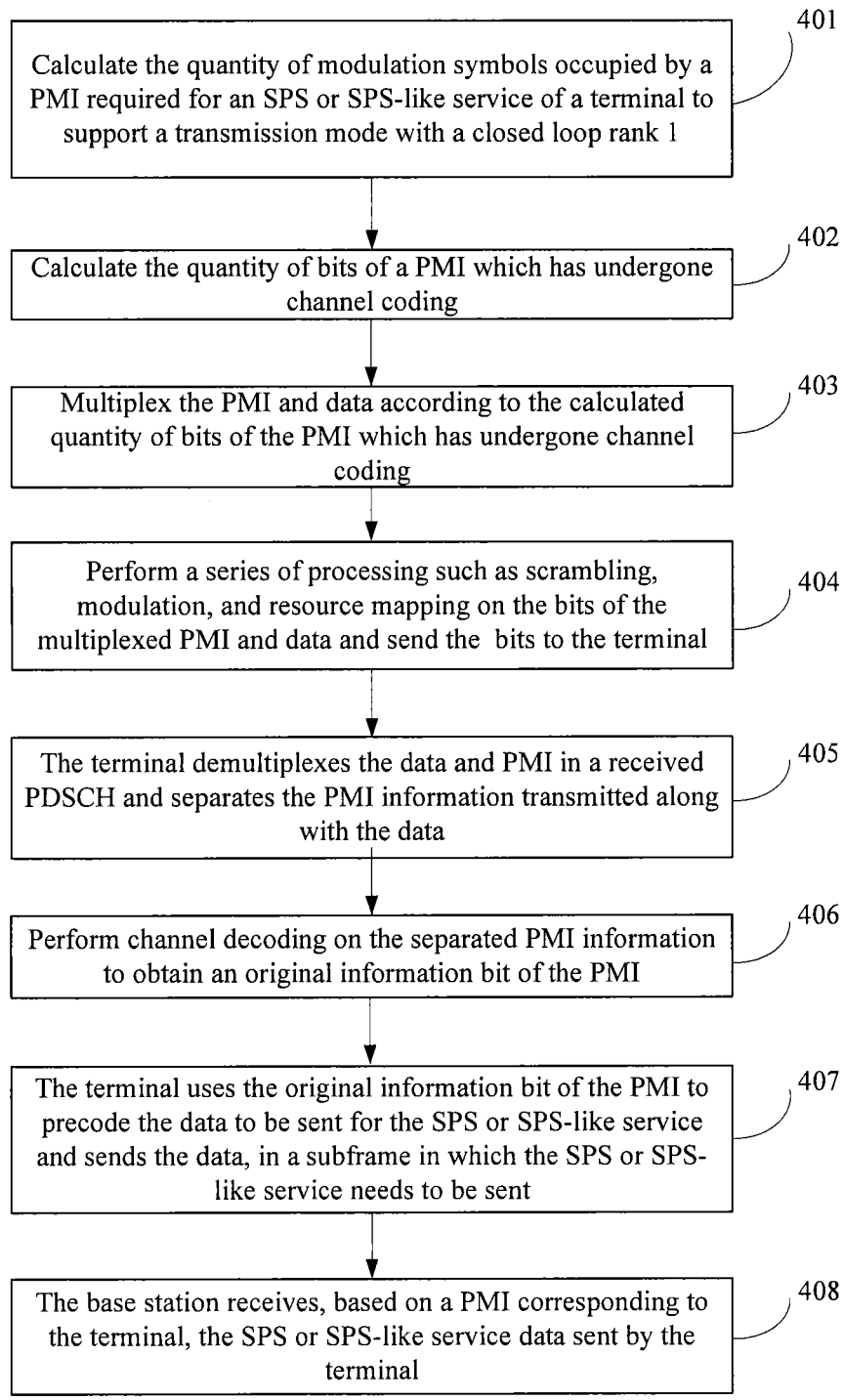
FIG. 4 is a flowchart of a method for realizing an SPS service or SPS-like service by adopting a second manner according to an embodiment of the present invention.

As shown in FIG. 4 is a flowchart of a method for realizing an SPS service or SPS-like service by adopting the second manner according to an embodiment of the present invention, including the following steps:

Step 401: Calculate the quantity of modulation symbols occupied by a PMI required for the SPS service or SPS-like service of a terminal to support a transmission mode with a closed loop rank 1.

Specifically, the calculation may be performed according to the following formula:

$$Q' = \left\lceil \frac{O \cdot \beta_{offset}^{PDSCH}}{Q_m \cdot R} \right\rceil \quad (1)$$

where, Q' is the quantity of modulation symbols occupied by the PMI; O is the quantity of bits of original information of the PMI; $Q_m$ is the quantity of modulation orders; R is a coding rate of data; $\beta_{offset}^{PDSCH}$ is a offset is a offset of the PMI relative to a data modulation and coding scheme (MCS, Modulation and Coding Scheme), where the value is notified semi-statically by higher layer signaling, such as RRC signaling.

Step 402: Calculate the quantity of bits of a PMI which has undergone channel coding.

Specifically, the calculation may be performed by using the following formula:

$$Q = Q_m \cdot Q' \quad (2)$$

where, Q is the quantity of bits of the PMI which has undergone channel coding and $Q_m$ is the quantity of modulation orders.

Step 403: Multiplex the PMI and data according to the calculated quantity of bits of the PMI which has undergone channel coding.

The multiplexing process may include two steps: (1) perform channel coding-related processing on the data and PMI separately, where RM (Reed-Muller) coding may be adopted for the PMI; and (2) multiplex the coded data and PMI. Step (2) may be implemented in two manners: One is that bits of the PMI which has undergone channel coding is placed before bits of the data which has undergone channel coding; the other is that the last Q bits of the data which has undergone channel coding is replaced with the bits of the coded PMI.

Step 404: Perform a series of processing such as scrambling, modulation, and resource mapping on the bits of the multiplexed PMI and data and then send the bits to the terminal.

A method for performing a series of processing such as scrambling, modulation, and resource mapping on the bits of the multiplexed PMI and data is the same as that when only service data is sent.

Step 405: The terminal demultiplexes the data and PMI in the received PDSCH and separates PMI information transmitted along with the data.

Step 406: Perform channel decoding on the separated PMI information to obtain an original information bit of the PMI.

Step 407: The terminal uses the original information bit of the PMI to precode the data to be sent for the SPS service or SPS-like service and sends the data, in a subframe in which the SPS service or SPS-like service needs to be sent.

Step 408: The base station receives, based on a PMI corresponding to the terminal, the SPS service or SPS-like service data sent by the terminal.

It can be seen that, in the embodiment of the present invention, the PMI information and downlink data sent in the PDSCH are multiplexed and transmitted, which thereby may save the overheads.

Third Manner

The PMI information is carried in the PDSCH, which is similar to the second manner, but a multiplexing manner of the PMI and the downlink data is different from that in the second manner.

Figure 5:
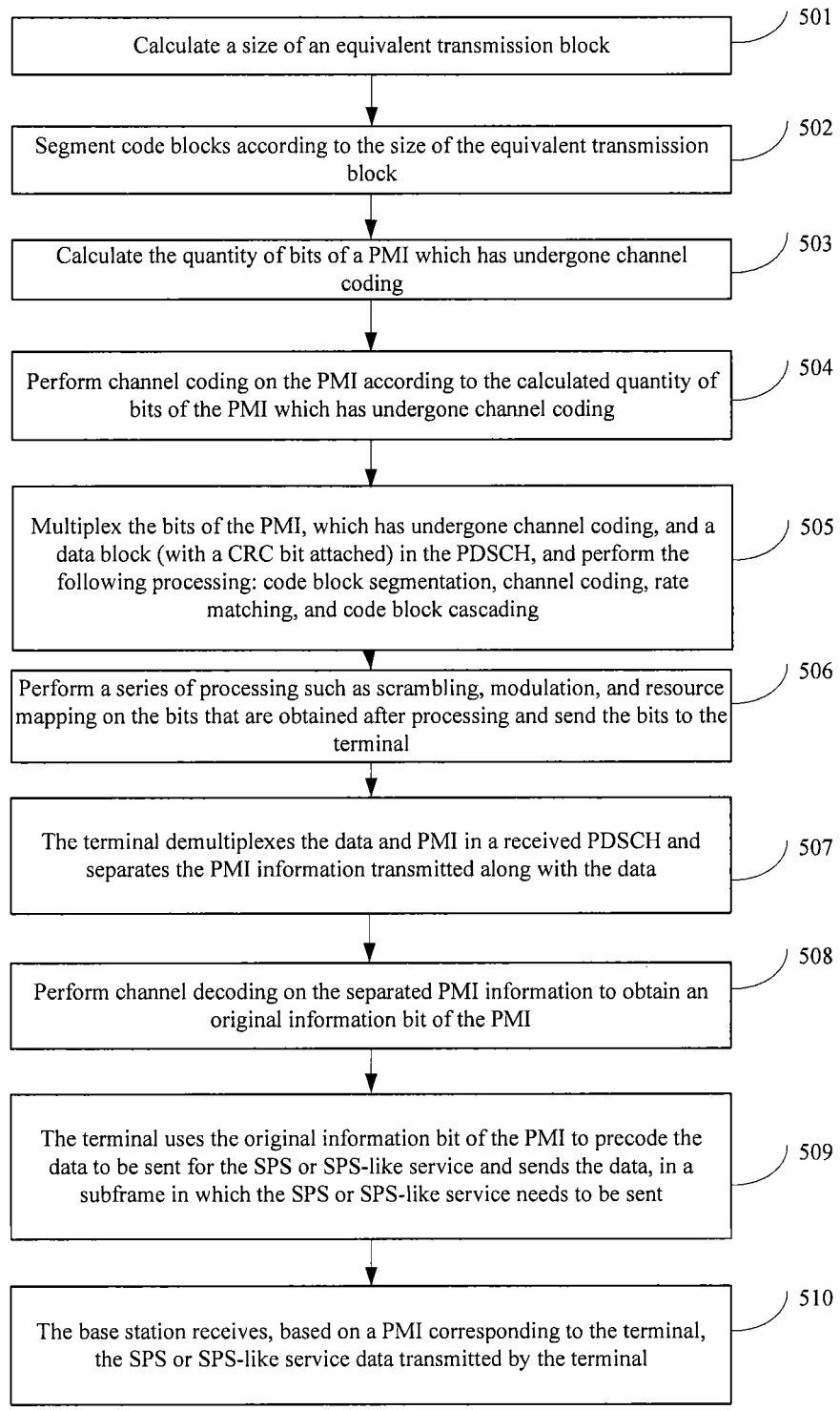
FIG. 5 is a flowchart of a method for realizing an SPS service or SPS-like service by adopting a third manner according to an embodiment of the present invention.

As shown in FIG. 5 is a flowchart of a method for realizing an SPS service or SPS-like service by adopting the third manner according to an embodiment of the present invention, including the following steps:

Step 501: Calculate a size of an equivalent transmission block, where the equivalent transmission block includes a PDSCH data information bit, a redundancy check bit, and an original bit of a PMI required for a terminal to support the SPS service or SPS-like service in adopting the transmission mode with the closed loop rank 1.

Specifically, the calculation may be performed according to the following formula:

$$B' = B + 24 + N \quad (3)$$

where, B' is the size of the equivalent transmission block; B is a size of a transmission block of PDSCH data; 24 is the redundancy check bits; and N is the number of original bits of the PMI to be sent.

Step 502: Segment code blocks according to the size of the equivalent transmission block.

Step 503: Calculate the quantity of bits of a PMI which has undergone channel coding.

Specifically, the calculation may be performed based on the following formula:

$$F = C_+ \cdot K_+ + C_- \cdot K_- - B'' \quad (4)$$

where, F is the quantity of bits of the PMI which has undergone channel coding; $C_+$ is the quantity of code blocks with their sizes being $K_+$; $C_-$ is the quantity of code blocks with their sizes being $K_-$; the sum of $C_+$ and $C_-$ is the total quantity of code blocks which is obtained in the second step; the values of $K_+$ and $K_-$ are found in a existing protocol; B"=B+24

Step 504: Perform channel coding on the PMI according to the calculated quantity of bits of the PMI which has undergone channel coding.

For example, RM coding is performed.

Step 505: Multiplex the bits of the PMI, which has undergone channel coding, and a data block in the PDSCH, and perform the following processing: code block segmentation, channel coding, rate matching, and code block cascading.

The processing is the same as that when only service data is sent, and is not detailed herein. A CRC check bit is attached to the data block in the PDSCH.

Step 506: Perform a series of processing such as scrambling, modulation, and resource mapping on the bits that are obtained after the processing in step 505 and send the bits to the terminal.

A method for performing a series of processing such as scrambling, modulation, and resource mapping are the same as that when only service data is sent.

Step 507: The terminal demultiplexes the data and PMI in a received PDSCH and separates PMI information transmitted along with the data.

Step 508: Perform channel decoding on the separated PMI information to obtain an original information bit of the PMI.

Step 509: The terminal uses the original information bit of the PMI to precode the data to be sent for the SPS service or SPS-like service and sends the data, in a subframe in which the SPS service or SPS-like service needs to be sent.

Step 510: The base station receives, based on a PMI corresponding to the terminal, the SPS service or SPS-like service data sent by the terminal.

In the embodiment of the present invention, the PMI information and downlink data sent in the PDSCH are multiplexed and transmitted, which not only saves the overheads, but also provides stronger protection for the PMI because channel coding is performed twice on the PMI information.

Fourth Manner

In this manner, a field "TPC command for PUCCH (transmit power control command for PUCCH)" in a PDCCH DL grant is used to transmit 2-bit PMI information, so as to realize that an SPS-like service supports a transmission mode with a closed loop rank 1. The PDCCH DL grant includes PDCCH DCI format 1, 1A, 1B, 1D, 2, 2A, 2B, or 2C, or other new DCI formats. Specifically, in an SPS-like period, each time when the base station delivers PDCCH format 1, 1A, 1B, 1D, 2, 2A, 2B, or 2C, or other new DCI formats, the field "TPC command for PUCCH" carries latest PMI information.

Correspondingly, the terminal detects a PDCCH in a subframe with PDCCH DCI format 1, 1A, 1B, 1D, 2, 2A, 2B, or 2C, or other new DCI formats being delivered, and if the detection is successful, the terminal updates the PMI information which the terminal stores. each time when the terminal needs to send SPS-like service data, a latest PMI is used.

Figure 6:
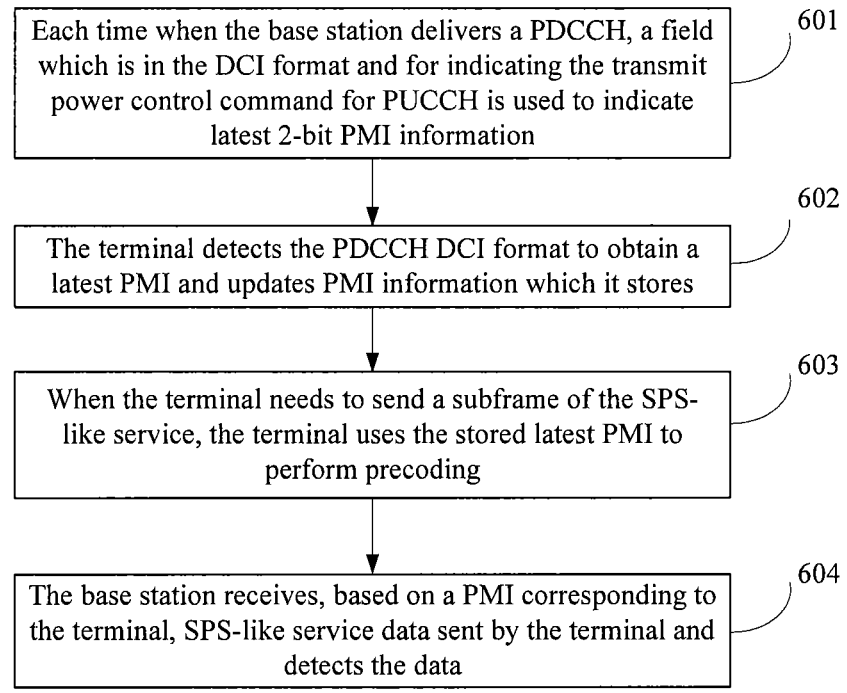
FIG. 6 is a flowchart of a method for realizing an SPS-like service by adopting a fourth manner according to an embodiment of the present invention.

FIG. 6 is a flowchart of a method for realizing an SPS-like service by adopting the fourth manner according to an embodiment of the present invention, including the following steps:

Step 601: Each time when a base station delivers a PDCCH, a field which is in a DCI format and for indicating a transmit power control command for PUCCH is used to indicate latest 2-bit PMI information.

Step 602: A terminal detects the DCI format of the PDCCH to obtain a latest PMI and updates PMI information which it stores.

Step 603: When the terminal needs to send a subframe of the SPS-like service, the terminal uses a stored latest PMI to perform precoding.

Step 604: The base station receives, based on a PMI corresponding to the terminal, SPS-like service data sent by the terminal, and detects the data.

This embodiment of the present invention can reuse an existing mechanism to the most extent and has little effects on the existing standard. However, because the field "TPC command for PUCCH" in the DCI format 1, 1A, 1B, 1D, 2, 2A, 2B, or 2C, or other new DCI formats of the PDCCH is used, this manner is only applicable to such SPS-like services as periodic CSI feedback on PUSCH, that is, to a scenario where the PUCCH is unneeded.

Fifth Manner

In this manner, a base station uses a PHICH (Physical Hybrid ARQ Indicator Channel, physical hybrid ARQ indicator channel) resource corresponding to a PUSCH allocated to an SPS-like service to send PMI information, so that the SPS-like service supports a transmission mode with a closed loop rank 1.

For such SPS-like services as periodic CSI reporting on PUSCH realized by an SPS mechanism, the base station does not need to feed back an ACK (Acknowledgment, positive acknowledgment) or NACK (Negative Acknowledgement, negative acknowledgement), so the PHICH resource corresponding to the PUSCH becomes idle, and may be used to transmit a PMI required for transmission of an uplink SPS-like service. A terminal detects the PHICH in an SPS-like period and updates a stored PMI if the detection is successful.

Figure 7:
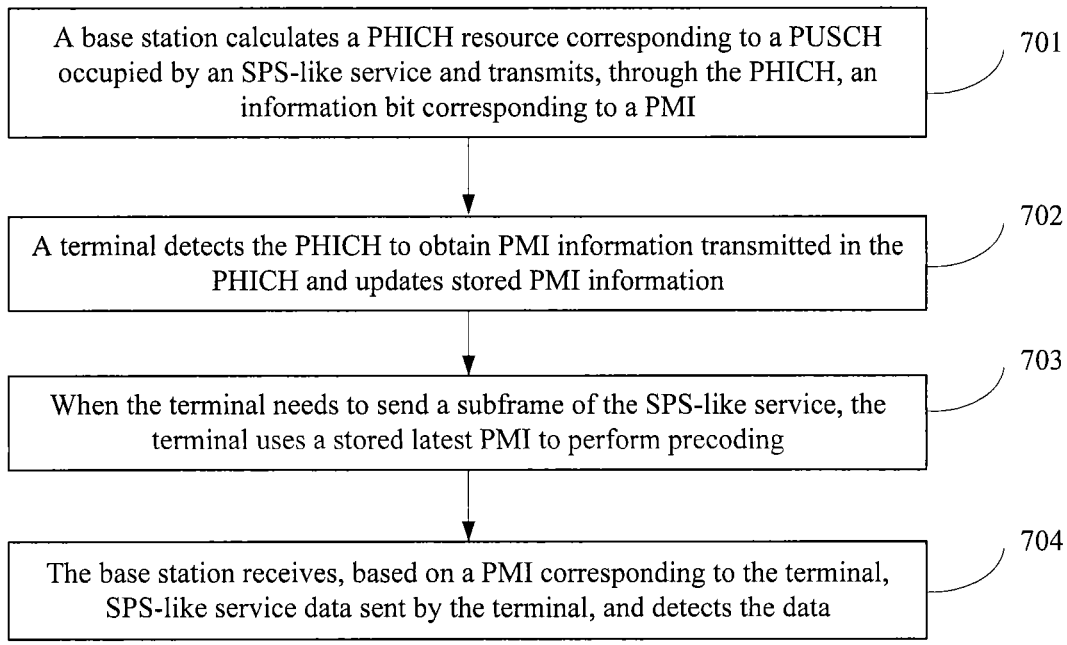
FIG. 7 is a flowchart of a method for realizing an SPS-like service by adopting a fifth manner according to an embodiment of the present invention.

FIG. 7 is a flowchart of a method for realizing an SPS-like service by adopting the fifth manner according to an embodiment of the present invention, including the following steps:

Step 701: A base station calculates a PHICH resource corresponding to a PUSCH occupied by the SPS-like service and transmits, through a PHICH, an information bit corresponding to a PMI.

The calculation of the PHICH resource corresponding to the PUSCH occupied by the SPS-like service is the same as that in the prior art and is not detailed herein.

The information bit corresponding to the PMI may be used as an original information bit of the PHICH to perform a series of transmission and reception procedures required for PHICH transmission.

Step 702: A terminal detects the PHICH to obtain PMI information sent on the PHICH and updates stored PMI information.

Step 703: When the terminal needs to send a subframe of the SPS-like service, the terminal uses a stored latest PMI to perform precoding Step 704: The base station receives, based on a PMI corresponding to the terminal, SPS-like service data sent by the terminal, and detects the data.

It should be noted that, in step 701 above, alternatively, an I resource or a Q resource corresponding to the calculated PHICH resource is also used to transmit the PMI information on a basis that an existing method is used to calculate the PHICH resource corresponding to the PUSCH occupied by the SPS-like service, which may increase the number of supported bits of the PMI information.

This solution has little effects on the standard but, because the PHICH resource corresponding to the PUSCH is used, this solution is applicable to a service in which the feedback of a PUSCH ACKNACK is not needed, such as periodic CSI feedback on the PUSCH.

Sixth Manner

In this manner, a PMI is carried by suing PDCCH signaling that activates an SPS service or SPS-like service, that is, a PMI field in the signaling is made effective and the PMI is carried in the field, where the PMI is the best PMI obtained by a base station through long-time statistics.

Figure 8:
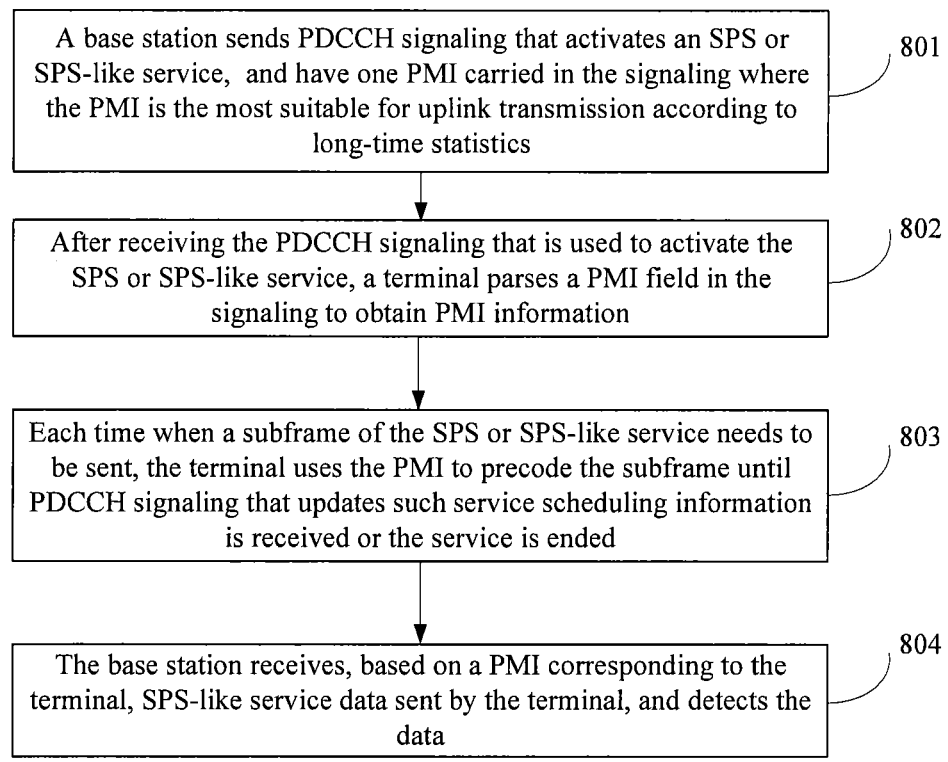
FIG. 8 is a flowchart of a method for realizing an SPS service or SPS-like service by adopting a sixth manner according to an embodiment of the present invention.

FIG. 8 is a flowchart of a method for realizing an SPS service or SPS-like service by adopting the sixth manner according to an embodiment of the present invention, including the following steps:

Step 801: A base station sends PDCCH signaling that activates the SPS service or SPS-like service, and have one PMI carried in the signaling, where the PMI is the most suitable for uplink transmission according to long-time statistics.

Step 802: After receiving the PDCCH signaling that is used to activate the SPS service or SPS-like service, a terminal parses a PMI field in the signaling to obtain PMI information.

Step 803: Each time when a subframe of the SPS service or SPS-like service needs to be sent, the terminal uses the PMI to perform precoding until PDCCH signaling that updates such service scheduling information is received or the service is ended.

Step 804: The base station receives, based on a PMI corresponding to the terminal, SPS-like service data sent by the terminal, and detects the data.

This solution requires almost no change to an existing standard to enable the SPS service or SPS-like service that is activated or released through PDCCH signaling to support the transmission mode with the closed loop rank 1, which effectively improves the performance of the SPS service or SPS-like service.

Seventh Manner

In this manner, a new channel realized by using a PHICH-like mechanism is set, described as a PMI control channel herein. The PMI control channel is used to send the PMI, to realize that the SPS service or SPS-like service supports a transmission mode with a closed loop rank 1.

Figure 9:
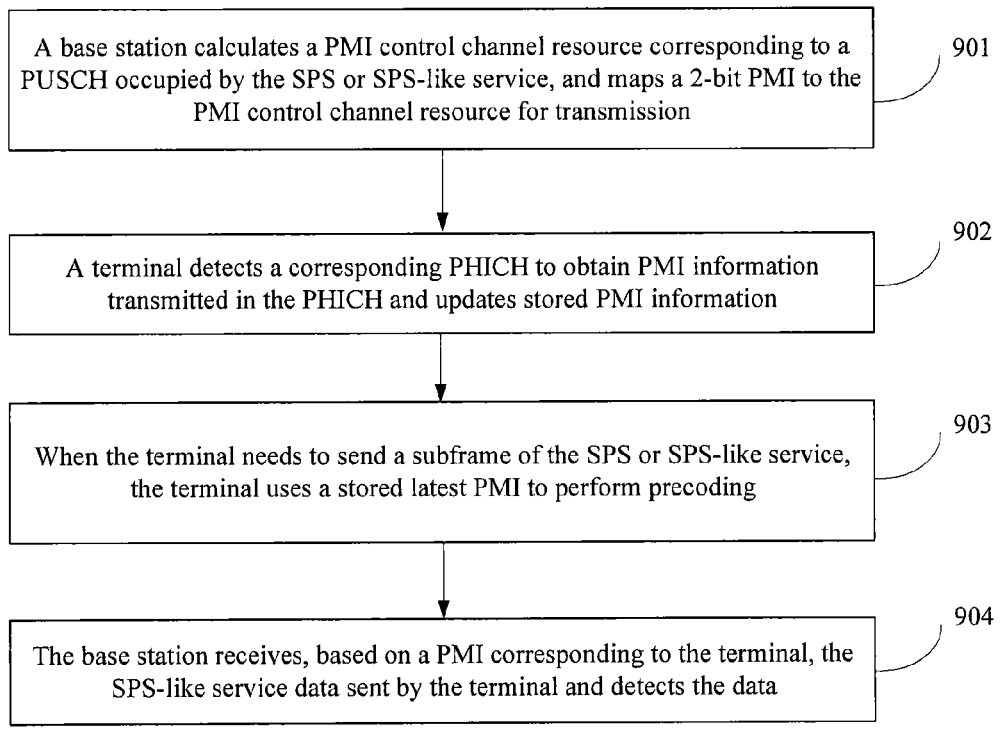
FIG. 9 is a flowchart of a method for realizing an SPS service or SPS-like service by adopting a seventh manner according to an embodiment of the present invention.

FIG. 9 is a flowchart of a method for realizing an SPS service or SPS-like service by adopting the seventh manner according to an embodiment of the present invention, including the following steps:

Step 901: A base station calculates a PMI control channel resource corresponding to a PUSCH occupied by the SPS service or SPS-like service, and maps a 2-bit PMI to the PMI control channel resource for transmission.

First, a group identifier and an intra-group identifier of the PMI control channel corresponding to the PUSCH are calculated according to an existing method, and then the PMI control channel resource paired with the calculated intra-group identifier and in this group is allocated to a terminal, where the paired resource means an I resource or a Q resource corresponding to the calculated intra-group identifier.

The a high-order bit of the 2-bit PMI may be mapped to the PMI control channel resource for transmission, and a low-order bit may be mapped to the PMI control channel, which corresponds to the I or Q resource corresponding to the intra-group identifier, for transmission. Alternatively, the low-order bit of the 2-bit PMI may be mapped to the PMI control channel resource for transmission, and the high-order bit may be mapped to the PMI control channel, which corresponds to the I or Q resource corresponding to the intra-group identifier, for transmission.

Step 902: The terminal detects a corresponding PHICH to obtain PMI information transmitted in the PHICH and updates stored PMI information.

Step 903: When the terminal needs to send a subframe of the SPS service or SPS-like service, the terminal uses a stored latest PMI to perform precoding.

Step 904: The base station receives, based on a PMI corresponding to the terminal, SPS-like service data sent by the terminal and detects the data.

Whichever of the foregoing manners is adopted, in the present invention, the base station dynamically notifies the terminal of the PMI required for its SPS service or SPS-like service to support the transmission mode with the closed loop rank 1, which may make such service support a MIMO transmission mode with a closed loop spatial multiplexing rank 1 effectively improves the transmission performance of the service, and further provides the following benefits:

1. If a throughput of such service is unchanged, transmit power of such user equipment (UE) may be reduced through power control while a block error ratio (Block Error Ratio, BLER) requirement is satisfied, which thereby reduces interference with other users and increases a throughput of the whole system, and meanwhile prolongs the service life of a UE battery.

2. If there is no need to reduce the transmit power, a coding rate of such service may be increased and the resources allocated to such user may be reduced, while the BLER requirement is satisfied.

3. For periodic CSI feedback on PUSCH, the improved transmission performance can guarantee the reliability of CSI while makes the mode of periodic CSI feedback on PUSCH become the best compromise between the quantity of CSI feedback and resource overheads.

Persons of ordinary skill in the art understand that all or part of the steps in the method in the foregoing embodiments may be implemented by a program instructing hardware. The program may be stored in a computer readable storage medium, where the storage medium is, for example, a ROM/RAM, a magnetic disk, a CD-ROM and so on.

Accordingly, embodiments of the present invention also provide a base station and a terminal.

Figure 10:
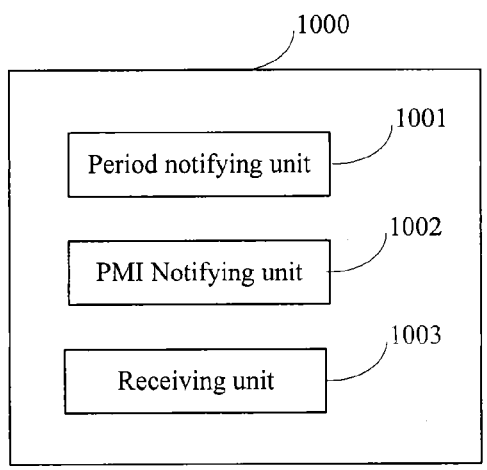
FIG. 10 is a schematic structural diagram of a base station according to an embodiment of the present invention.

As shown in FIG. 10 is a schematic structural diagram of a base station according to an embodiment of the present invention.

In this embodiment, the base station 1000 includes:

a period notifying unit 1001, configured to notify a terminal of its SPS or SPS-like period, so that the terminal send the SPS service or SPS-like service data according to the period and by adopting a transmission mode with a closed loop rank 1;

a PMI notifying unit 1002, configured to dynamically notify the terminal of a precoding matrix indicator PMI required for its SPS service or SPS-like service to support the transmission mode with the closed loop rank 1, so that the terminal uses a latest received PMI when sending the SPS service or SPS-like service data; and a receiving unit 1003, configured to receive, based on the transmission mode with the closed loop rank 1, the SPS service or SPS-like service data sent by the terminal.

The base station in the embodiment of the present invention notifies, by adopting a dynamic manner, the terminal of the PMI required for its SPS service or SPS-like service to support the transmission mode with the closed loop rank 1, which thereby may make the SPS service or SPS-like service support a closed loop spatial multiplexing MIMO transmission mode, and effectively improve the transmission performance of the SPS service or SPS-like service.

In the embodiment of the present invention, the PMI notifying unit 1003 may adopt different manners to realize the dynamic notification of a PMI.

Figure 11:
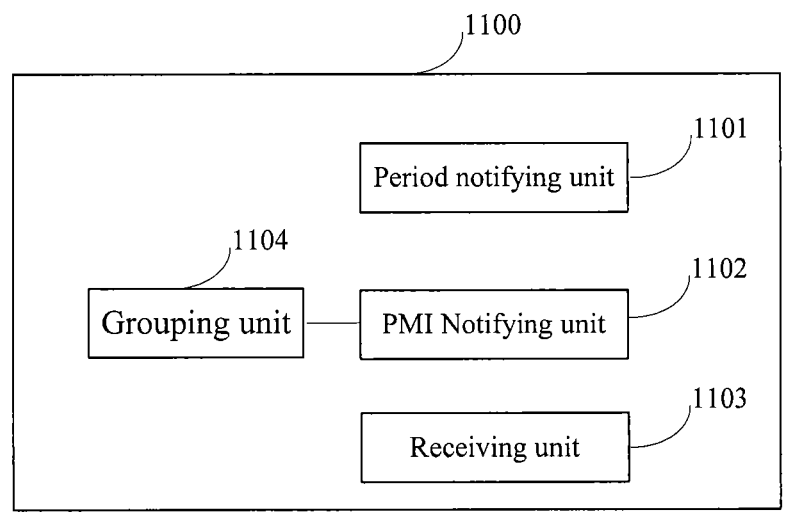
FIG. 11 is a schematic structural diagram of specific implementation of a base station according to an embodiment of the present invention.

As shown in FIG. 11 is a schematic structural diagram of a base station according to a specific implementation of an embodiment of the present invention.

What is different for the embodiment shown in FIG. 10 is that, in the embodiment of the present invention, the base station 1100 not only includes:

a period notifying unit 1101, a PMI notifying unit 1102, and a receiving unit 1103 consistent with those in the embodiment shown in FIG. 10, but also includes:

a grouping unit 1104, configured to group a terminal having an SPS service or SPS-like service, allocate one group identifier to each group, allocate one intra-group identifier to the terminal, and notify the terminal of the group identifier and intra-group identifier of the terminal.

Specifically, the grouping unit 1104 may group the terminal having SPS service or SPS-like service, according to any one of manners or a combination of multiple manners in the following:

Terminals with corresponding PMIs of the same number of bits is taken as one group;

terminals with corresponding PMIs having the same or proximately the same update periods are taken as one group;

terminals with the same or proximately the same moments corresponding to resources allocated for the SPS service or SPS-like service are taken as one group; and all or part of terminals in a TPC group corresponding to DCI format 3 or DCI format 3A are taken as one group.

Accordingly, the PMI notifying unit 1102 is specifically configured to multicast, through a PDCCH to terminals in each group, the PMIs required for their SPS services or SPS-like services to support the transmission mode with the closed loop rank 1. For example, DCI format 3B or 3C of the PDCCH may be set, where DCI format 3B corresponds to a 2-bit PMI, DCI format 3C corresponds to a 4-bit PMI, and DCI format 3B or 3C of the PDCCH is used to send the terminals in each group the PMIs required for their SPS services or SPS-like services to support the transmission mode with the closed loop rank 1.

Definitely, the PMI notifying unit 1002 shown in FIG. 10 may have other implementation manners, for example:

the PMI and downlink data carried on a PDSCH are multiplexed and sent; or each time when a PDCCH is delivered, a field which is in the DCI format and for indicating the transmit power control command for PUCCH is used to indicate a latest 2-bit PMI information; or a PHICH resource corresponding to a PUSCH occupied by the SPS-like service is calculated and the PMI is sent through the PHICH; or a best PMI obtained through long-time statistics is carried and sent in PDCCH signaling that is used to activate the SPS service or SPS-like service; or a PMI control channel adopting a PHICH like mechanism is set and the PMI control channel is used to send the PMI.

For the PMI transmission processes in various manners, reference may be made to the description of the method for realizing the SPS service or SPS-like service in the foregoing embodiments of the present invention, and details are not repeated herein.

In an exemplary embodiment in which the PMI notifying unit 1002 adopts the multiplexing transmission of the PMI with the downlink data sent on the PDSCH, the PMI notifying unit 1002 includes:

a first calculating subunit, configured to calculate the quantity of modulation symbols occupied by the PMI required for the SPS service or SPS-like service of the terminal to support the transmission mode with the closed loop rank 1, and calculate, according to the quantity of modulation symbols occupied by the PMI, the quantity of bits of a PMI which has undergone channel coding;

a first coding processing subunit, configured to perform channel coding-related processing on the data and the PMI;

a first multiplexing subunit, configured to multiplex the coded data and PMI; and a first sending subunit, configured to send the multiplexed data and PMI.

The first multiplexing subunit is specifically configured to place the bits of the PMI, which has undergone channel coding, before the bits of the data which has undergone channel coding; or replace, with the bits of the coded PMI, the last bits of the data which has undergone channel coding, where the quantity of the last bits of the downlink data is the same as the quantity of bits of the PMI which has undergone channel coding.

In another exemplary embodiment in which the PMI notifying unit 1002 adopts the multiplexing transmission of the PMI with the downlink data sent on the PDSCH, the PMI notifying unit 1002 includes:

a second coding processing subunit, configured to perform channel coding on the PMI according to the pre-calculated quantity of bits of the PMI which has undergone channel coding;

a second multiplexing subunit, configured to multiplex the PMI and data which have undergone channel coding; and a second sending subunit, configured to send the multiplexed PMI and data.

In addition, the PMI notifying unit 1002 may further include:

a second calculating subunit, configured to calculate a size of an equivalent transmission block which includes a PDSCH data information bit, a redundancy check bit, and a information bit of the PMI required for the SPS service or SPS-like service of the terminal to support the transmission mode with the closed loop rank 1;

a code block segmenting subunit, configured to segment code blocks according to the size of the equivalent transmission block; and a third calculating subunit, configured to calculate, according to the segmented code blocks, the quantity of bits of the PMI which has undergone channel coding.

In an exemplary embodiment in which each time when a PDCCH is delivered, the PMI notifying unit 1002 uses the field, which is in the DCI format and for indicating the transmit power control command for PUCCH, to indicate the latest 2-bit PMI information, the PMI notifying unit 1002 includes:

a PDCCH constructing subunit, configured to, when the PDCCH is constructed, use the field, which is in the DCI format and for indicating the transmit power control command for PUCCH, to indicate the latest 2-bit PMI information; and a PDCCH sending subunit, configured to send the PDCCH constructed by the PDCCH constructing subunit.

Figure 12:
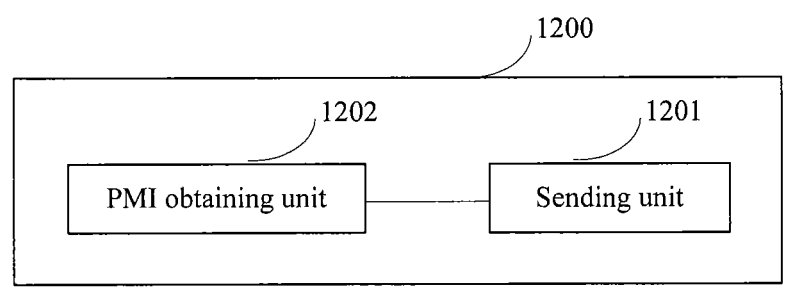
FIG. 12 is a schematic structural diagram of a terminal according to an embodiment of the present invention.

FIG. 12 is a schematic structural diagram of a terminal according to an embodiment of the present invention.

In the embodiment, a terminal 1200 includes a sending unit 1201 and a PMI obtaining unit 1202, where, the PMI obtaining unit 1202 is configured to obtain a PMI that is sent by a base station and required for an SPS service or SPS-like service to support a transmission mode with a closed loop rank 1; and the sending unit 1201 is configured to, by adopting the transmission mode with the closed loop rank 1, send the SPS service in its SPS period configured by the base station or send SPS-like service data in an SPS-like period, and after the PMI obtaining unit obtains a new PMI, use the new PMI to send the SPS service or SPS-like service data in the SPS period configured by the base station or in the SPS-like period.

With respect to different PMI transmission manners of the base station, in the embodiment of the present invention, the PMI obtaining unit 1202 may have multiple implementation manners, for example:

the PMI sent by the base station and required for the SPS service or SPS-like service to support the transmission mode with the closed loop rank 1 is obtained from a received PDCCH DCI format, such as 3B or 3C, where DCI format 3B corresponds to a 2-bit PMI and DCI format 3C corresponds to a 4-bit PMI; or the PMI multiplexed and sent with the downlink data and required for the SPS service or SPS-like service to support the transmission mode with the closed loop rank 1 is obtained from a received PDSCH; or the PMI required for the SPS service or SPS-like service to support the transmission mode with the closed loop rank 1 is obtained from the field which is for indicating the transmit power control command for PUCCH and in the PDCCH DCI format; or the PMI required for the SPS-like service to support the transmission mode with the closed loop rank 1 is obtained from a PHICH; or the PMI required for the SPS service or SPS-like service to support the transmission mode with the closed loop rank 1 is obtained from PDCCH signaling that is sent by the base station and used to activate the SPS service or SPS-like service; or the PMI required for the SPS service or SPS-like service to support the transmission mode with the closed loop rank 1 is obtained through a PMI control channel of a PHICH like mechanism.

For the PMI obtaining processes in various manners, reference may be made to the description of the method for realizing the SPS service or SPS-like service in the foregoing embodiments of the present invention, and details are not repeated herein.

The terminal in the embodiment of the present invention sends the SPS service or SPS-like service data by adopting the transmission mode with the closed loop rank 1, and after obtaining the PMI that is sent by the base station and required for the SPS service or SPS-like service to support the transmission mode with the closed loop rank 1, uses the new PMI each time when the SPS service or SPS-like service data is sent, which thereby may make the SPS service or SPS-like service support a closed loop spatial multiplexing MIMO transmission mode, and effectively improve the transmission performance of the SPS service or SPS-like service.

It should be noted that, the base station and terminal in the embodiments of the present invention are not limited to the foregoing structures, where the units or subunits may be independent modules, or may also be multiple units or subunits combined in one module.

The embodiments of the present invention are described in detail above. Although the present invention is described with reference to specific implementation manners, the illustration of the embodiments is only intended to help to understand the method and device of the present invention. With respect to the implementation manner and application scope, modifications and variations may be made by persons of ordinary skill in the art according to the idea of the present invention. Therefore, the content of this specification shall not be construed as a limitation on the present invention.

What is claimed is:

1. A method for realizing a semi-persistent scheduling (SPS) or SPS-like service, comprising:
    notifying a terminal of its SPS or SPS-like period, so that the terminal sends SPS service or SPS-like service data according to the period and by adopting a multiple input multiple output (MIMO) transmission mode with a closed loop rank 1;
    dynamically notifying the terminal of a precoding matrix indicator (PMI) required for its SPS service or SPS-like service to support the transmission mode with the closed loop rank 1, so that the terminal uses a latest received PMI when sending the SPS service or SPS-like service data; and
    receiving, based on the transmission mode with the closed loop rank 1, the SPS service or SPS-like service data sent by the terminal, wherein
        a SPS-like service is a non-SPS service that is activated and released through physical downlink control channel (PDCCH) signaling or that transmits information on a predefined frequency resource at fixed periods through higher layer signaling configuration, and
        a SPS-like period is a time interval for transmission of a new packet in the SPS-like service on a predefined frequency resource.

2. The method according to claim 1, wherein, the method further comprises:
    grouping, in advance, a terminal having SPS service or SPS-like service, allocating one group identifier to each group, allocating one intra-group identifier to the terminal, and notifying the group identifier and intra-group identifier of the terminal to the terminal, so that the terminal detects a physical downlink control channel (PDCCH) downlink control information (DCI) format according to its own group identifier and obtains the corresponding PMI according to its own intra-group identifier; and
    the dynamically notifying the terminal of a PMI required for its SPS service or SPS-like service to support the transmission mode with the closed loop rank 1 comprises:
    using the group identifier of each group to mask the cyclical redundancy check (CRC) of a PDCCH, and using the PDCCH to multicast, to terminals in each group, PMIs required for their SPS services or SPS-like services to support the transmission mode with the closed loop rank 1.

3. The method according to claim 2, wherein the grouping the terminal having SPS service or SPS-like service comprises: grouping the terminal having SPS service or SPS-like service in any one of manners or a combination of multiple manners in the following:
    terminals with corresponding PMIs of the same number of bits are taken as one group;
    terminals with corresponding PMIs having the same update periods or update periods between which a deviation is within a first predetermined range are taken as one group;
    terminals with the same moments corresponding to resources allocated for the SPS service or SPS-like service or with a deviation between moments corresponding to resources allocated for the SPS service or SPS-like service within a second predetermined range are taken as one group; and all or part of terminals in a transmit power control (TPC) group corresponding to DCI format 3 or DCI format 3A are taken as one group.

4. The method according to claim 2, wherein, the using the PDCCH to multicast, to the terminals in each group, the PMIs required for their SPS services or SPS-like services to support the transmission mode with the closed loop rank 1 comprises: using DCI format 3B or 3C of the PDCCH to multicast, to the terminals in each group, the PMIs required for their SPS services or SPS-like services to support the transmission mode with the closed loop rank 1, wherein DCI format 3B corresponds to a 2-bit PMI, DCI format 3C corresponds to a 4-bit PMI, the PMIs of each group of terminals are sorted in order of intra-group identifiers, and the load of DCI format 3B or 3C of the PDCCH is the same as the load of DCI format 0.

5. The method according to claim 1, wherein the dynamically notifying the terminal of a PMI required for its SPS service or SPS-like service to support the transmission mode with the closed loop rank 1 comprises:
multiplexing and sending the PMI, which is required for the SPS service or SPS-like service of the terminal to support the transmission mode with the closed loop rank 1, with downlink data sent on a physical downlink shared channel PDSCH.

6. The method according to claim 5, wherein the multiplexing and sending the PMI, which is required for the SPS service or SPS-like service of the terminal to support the transmission mode with the closed loop rank 1, with the downlink data sent on the PDSCH comprises:
calculating the quantity of modulation symbols occupied by the PMI required for the SPS service or SPS-like service of the terminal to support the transmission mode with the closed loop rank 1;
calculating, according to the modulation symbols occupied by the PMI, the quantity of bits of a PMI which has undergone channel coding; and
according to the calculated quantity of bits of the PMI which has undergone channel coding, performing multiplexing processing on and sending the PMI and the downlink data to be sent on the PDSCH.

7. The method according to claim 6, wherein the performing multiplexing processing on the PMI and the downlink data to be sent on the PDSCH comprises:
performing channel coding-related processing on the downlink data and the PMI respectively; and
placing bits of the PMI, which has undergone channel coding, before bits of the downlink data which has undergone channel coding, or replacing, with the bits of the coded PMI, last bits of the downlink data which has undergone channel coding, wherein the quantity of the last bits of the downlink data is the same as the quantity of bits of the PMI which has undergone channel coding.

8. The method according to claim 5, wherein the multiplexing and sending the PMI, which is required for the SPS service or SPS-like service of the terminal to support the transmission mode with the closed loop rank 1, with the downlink data sent on the PDSCH comprises:
performing channel coding on the PMI according to the pre-calculated quantity of bits of the PMI which has undergone channel coding, and multiplexing and sending the PMI, which has undergone channel coding, with the downlink data sent on the PDSCH.

9. The method according to claim 8, wherein the calculating the quantity of bits of the PMI which has undergone channel coding comprises:
calculating a size of an equivalent transmission block which comprises a PDSCH data information bit, a redundancy check bits, and an information bit of the PMI required for the SPS service or SPS-like service of the terminal to support the transmission mode with the closed loop rank 1;
segmenting code blocks according to the size of the equivalent transmission block; and
calculating, according to the segmented code blocks, the quantity of bits of the PMI which has undergone channel coding.

10. The method according to claim 1, wherein the dynamically notifying the terminal of the PMI required for its SPS-like service to support the transmission mode with the closed loop rank 1 comprises:
each time when a base station delivers a PDCCH, using a field, which is in a DCI format and for indicating a transmit power control command for PUCCH, to indicate latest 2-bit information of the PMI required for the SPS-like service to support the transmission mode with the closed loop rank 1; or
calculating, by the base station, a physical hybrid ARQ indicator channel (PHICH) resource corresponding to a PUSCH occupied by the SPS-like service, and sending, through the PHICH, the PMI required for the SPS-like service to support the transmission mode with the closed loop rank 1; or
using a set PMI control channel to send the PMI required for the SPS-like service to support the transmission mode with the closed loop rank 1.

11. A method for realizing a semi-persistent scheduling (SPS) service or SPS-like service, comprising:
by adopting a multiple input multiple output (MIMO) transmission mode with a closed loop rank 1, sending, by a terminal, the SPS service in an SPS period configured by a base station or sending SPS-like service data in an SPS-like period; and
obtaining a new PMI that is notified by the base station dynamically and required for the SPS or SPS-like service to support the transmission mode with the closed loop rank 1, and using the new PMI to send the SPS service or SPS-like service data in the SPS period configured by the base station or in the SPS-like period, wherein
a SPS-like service is a non-SPS service that is activated and released through physical downlink control channel (PDCCH) signaling or that transmits information on a predefined frequency resource at fixed periods through higher layer signaling configuration, and
a SPS-like period is a time interval for transmission of a new packet in the SPS-like service on a predefined frequency resource.

12. The method according to claim 11, further comprising:
in any one of the following manners, obtaining the new PMI that is notified by the base station dynamically and required for the SPS or SPS-like service to support the transmission mode with the closed loop rank 1:
receiving a group identifier and an intra-group identifier that are sent by the base station, detecting a DCI format of a received PDCCH according to the group identifier, and obtaining, according to the intra-group identifier, the PMI that is notified by the base station and required for the SPS or SPS-like service to support the transmission mode with the closed loop rank 1;
obtaining, from a received PDSCH, the PMI that is multiplexed and sent with downlink data and required for the SPS or SPS-like service to support the transmission mode with the closed loop rank 1;

obtaining, from a field indicating a transmit power control command for PUCCH in the PDCCH DCI format, the PMI required for the SPS or SPS-like service to support the transmission mode with the closed loop rank 1;

obtaining, from a PHICH, the PMI required for the SPS-like service to support the transmission mode with the closed loop rank 1; and obtaining, through a preset PMI control channel, the PMI required for the SPS or SPS-like service to support the transmission mode with the closed loop rank 1.

13. A base station, comprising:

a period notifying unit, configured to notify a terminal of its semi-persistent scheduling (SPS) or SPS-like period, so that the terminal sends SPS service or SPS-like service data according to the period and by adopting a multiple input multiple output (MIMO) transmission mode with a closed loop rank 1;

a PMI notifying unit, configured to dynamically notify the terminal of a precoding matrix indicator PMI required for its SPS or SPS-like service to support the transmission mode with the closed loop rank 1, so that the terminal uses a latest received PMI when sending the SPS service or SPS-like service data; and a receiving unit, configured to receive, based on the transmission mode with the closed loop rank 1, the SPS service or SPS-like service data sent by the terminal, wherein the terminal sends the SPS service or SPS-like service data according to the period received from the period notifying unit and by using the latest PMI received from the PMI notifying unit, wherein a SPS-like service is a non-SPS service that is activated and released through physical downlink control channel (PDCCH) signaling or that transmits information on a predefined frequency resource at fixed periods through higher layer signaling configuration, and a SPS-like period is a time interval for transmission of a new packet in the SPS-like service on a predefined frequency resource.

14. The base station according to claim 13, further comprising:

a grouping unit, configured to group a terminal having SPS or SPS-like service, allocate one group identifier to each group, allocate one intra-group identifier to the terminal, and notify the group identifier and intra-group identifier of the terminal to the terminal, so that the terminal detects a PDCCH DCI format according to its own group identifier and obtains a corresponding PMI according to its own intra-group identifier; wherein the PMI notifying unit is specifically configured to use the group identifier of each group to mask CRC of a PDCCH, and use the PDCCH to multicast, to terminals in each groups, PMIs required for their SPS services or SPS-like services to support the transmission mode with the closed loop rank 1.

15. The base station according to claim 14, wherein, the grouping unit is configured to group a terminal having the SPS or SPS-like service according to any one of manners or a combination of multiple manners in the following:

terminals with corresponding PMIs of the same number of bits are taken as one group;

terminals with corresponding PMIs having the same update periods or with periods between which a deviation is within a first predetermined range are taken as one group;

terminals with the same moments corresponding to resources allocated for the SPS or SPS-like service or with a deviation between moments corresponding to resources allocated for the SPS or SPS-like service within a second predetermined range are taken as one group; and all or a portion of terminals in a TPC group corresponding to DCI format 3 or DCI format 3A are taken as one group.

16. The base station according to claim 13, wherein, the PMI notifying unit is configured to multiplex and send the PMI, which is required for the SPS or SPS-like service of the terminal to support the transmission mode with the closed loop rank 1, with downlink data sent on a PDSCH.

17. The base station according to claim 16, wherein the PMI notifying unit comprises:

a first calculating subunit, configured to calculate the quantity of modulation symbols occupied by the PMI required for the SPS or SPS-like service of the terminal to support the transmission mode with the closed loop rank 1, and calculate, according to the quantity of modulation symbols occupied by the PMI, the quantity of bits of a PMI which has undergone channel coding;

a first coding processing subunit, configured to perform channel coding-related processing on the downlink data and the PMI;

a first multiplexing subunit, configured to receive the PMI and downlink data which have undergone channel coding by the first coding processing subunit, and place bits of the PMI, which has undergone channel coding, before bits of the downlink data which has undergone channel coding; or replace, with the bits of the PMI which has undergone channel coding, last bits of the downlink data which has undergone channel coding, wherein the quantity of the last bits of the downlink data is the same as the quantity of bits of the PMI which has undergone channel coding, and the quantity of bits of the PMI is calculated by the first calculating subunit; and a first sending subunit, configured to send the downlink data and PMI that are multiplexed by the first multiplexing subunit.

18. The base station according to claim 16, wherein the PMI notifying unit comprises:

a second coding processing subunit, configured to perform channel coding on the PMI according to the pre-calculated quantity of bits of the PMI which has undergone channel coding;

a second multiplexing subunit, configured to multiplex the PMI, which has undergone channel coding by the second coding processing subunit, with the downlink data sent on the PDSCH; and a second sending subunit, configured to send the PMI multiplexed by the second multiplexing subunit and the downlink data sent on the PDSCH.

19. The base station according to claim 18, wherein the PMI notifying unit further comprises:

a second calculating subunit, configured to calculate a size of an equivalent transmission block which comprises a PDSCH data information bit, a redundancy check bit, and an information bit of the PMI required for the SPS or SPS-like service of the terminal to support the transmission mode with the closed loop rank 1;

a code block segmenting subunit, configured to segment code blocks according to the size of the equivalent transmission block, wherein the size is calculated by the second calculating subunit; and a third calculating subunit, configured to calculate, according to the code blocks segmented by the code block segmenting subunit, the quantity of bits of the PMI which has undergone channel coding, and transmit the obtained quantity of bits of the PMI, which has undergone channel coding, to the second coding processing subunit.

20. The base station according to claim 13, wherein the PMI notifying unit comprises:
   a PDCCH constructing subunit, configured to, when the PDCCH is constructed, use a field, which is in a DCI format of a PDCCH used for indicating a transmit power control command for PUCCH, to indicate latest 2-bit information of the PMI required for the SPS-like service to support the transmission mode with the closed loop rank 1; and
   a PDCCH sending subunit, configured to send the PDCCH constructed by the PDCCH constructing subunit.

21. The base station according to claim 13, wherein,
   the PMI notifying unit is specifically configured to calculate a PHICH resource corresponding to a PUSCH occupied by the SPS-like service, and send the PMI through a PHICH; or specifically configured to send a best PMI obtained through long-time statistics, in PDCCH signaling used to activate the SPS or SPS-like service; or specifically configured to use a preset PMI control channel to send the PMI.

22. A terminal, comprising:
   a PMI obtaining unit, configured to obtain a PMI that is notified by a base station and required for a semi-persistent scheduling (SPS) service or SPS-like service to support a multiple input multiple output (MIMO) transmission mode with a closed loop rank 1; and
   a sending unit, configured to, by adopting the transmission mode with the closed loop rank 1, send the SPS service in an SPS period configured by the base station or send SPS-like service data in an SPS-like period, and after the PMI obtaining unit obtains a new PMI, use the new PMI to send the SPS service or SPS-like service data in the SPS period configured by the base station or in SPS-like period, wherein a SPS-like service is a non-SPS service that is activated and released through physical downlink control channel (PDCCH) signaling or that transmits information on a predefined frequency resource at fixed periods through higher layer signaling configuration, and
   a SPS-like period is a time interval for transmission of a new packet in the SPS-like service on a predefined frequency resource.

23. The terminal according to claim 22, wherein,
   the PMI obtaining unit is specifically configured to obtain, from a received PDCCH DCI format 3B or a DCI format 3C, the PMI that is notified by the base station and required for the SPS or SPS-like service to support the transmission mode with the closed loop rank 1, wherein DCI format 3B corresponds to a 2-bit PMI and DCI format 3C corresponds to a 4-bit PMI; or
   the PMI obtaining unit is specifically configured to obtain, from a received PDSCH, the PMI that is multiplexed and sent with downlink data and required for the SPS or SPS-like service to support the transmission mode with the closed loop rank 1; or
   the PMI obtaining unit is specifically configured to obtain, from a field which is for indicating a transmit power control command for PUCCH and is in the PDCCH DCI format, the PMI required for the SPS or SPS-like service to support the transmission mode with the closed loop rank 1; or
   the PMI obtaining unit is specifically configured to obtain, from a PHICH, the PMI required for the SPS-like service to support the transmission mode with the closed loop rank 1; or
   the PMI obtaining unit is specifically configured to obtain, through a preset PMI control channel, the PMI required for the SPS or SPS-like service to support the transmission mode with the closed loop rank 1.

* * * * *